United States Patent [19]

Lin

[11] Patent Number: 5,170,981
[45] Date of Patent: Dec. 15, 1992

[54] BOTTLE HOLDER FOR A BICYCLE
[75] Inventor: Mike Lin, Taichung, Taiwan
[73] Assignee: Topeak, Inc., Taichung, Taiwan
[21] Appl. No.: 820,505
[22] Filed: Jan. 14, 1992
[51] Int. Cl.⁵ ............................................. A47K 1/08
[52] U.S. Cl. .................................. 248/311.2; 224/35; 224/39; 248/316.8
[58] Field of Search ................... 248/311.2, 309.1, 314, 248/316.8, 205.1, 218.4; 224/35, 39; 215/100 R

[56] References Cited

U.S. PATENT DOCUMENTS

| | | | |
|---|---|---|---|
| 4,643,343 | 2/1987 | Goldman et al. | 224/39 X |
| 4,809,890 | 3/1989 | Tsigadas | 224/35 X |
| 5,040,709 | 8/1991 | Neubent | 248/311.2 X |
| 5,060,832 | 10/1991 | Link | 224/39 |

FOREIGN PATENT DOCUMENTS 2615158  11/1988  France .................... 224/39

Primary Examiner—Ramon O. Ramirez
Attorney, Agent, or Firm—Woodcock Washburn Kurtz Mackiewicz & Norris

[57] ABSTRACT

A holder for a bicycle including a frame for holding a bottle, a block formed on the frame and fixed to the bicycle, a cam portion formed on top of the block, a retainer having an opening formed in lower portion for engagement with the cam portion so as to limit rotation of the retainer relative to the block, a base which is provided for holding a lower portion of the bottle being coupled to the block, and a bag coupled to the lower portion of the block for carrying other objects.

2 Claims, 4 Drawing Sheets

BOTTLE HOLDER FOR A BICYCLE

BACKGROUND OF THE INVENTION

1. Field of the Invention

The present invention relates to a holder, and more particularly to a bottle holder for a bicycle.

2. Description of the Prior Art

Typical bottle holders for bicycle are generally fixed to the seat post of the bicycle for holding and carrying a bottle. The bottle holder includes a frame body which has a fixed configuration so that a very large mold is required. The manufacturing cost is expensive.

The present invention has arisen to mitigate and/or obviate the afore-described disadvantages of the conventional bottle holders.

SUMMARY OF THE INVENTION

The primary objective of the present invention is to provide a bottle holder for a bicycle including three different parts which can be easily manufactured separately and can be easily assembled so that the manufacturing thereof is easier.

In accordance with one aspect of the invention, there is provided a holder for a bicycle including a frame for holding a bottle, a block formed integral on the frame and fixed to the bicycle, an extension formed integral on top of the block, a cam portion formed integral on each side of the extension, a retainer including a lower portion pivotally coupled to the extension and including an opening formed in the lower portion for engagement with the cam portions of the block so as to limit rotation of the retainer relative to the block, a pair of ribs formed in parallel in a lower portion of the block and each having a depression formed therein, a base which is provided for holding a lower portion of the bottle including a slot formed in each side thereof for engagement with the ribs of the block so that the base is coupled to the block, a protrusion formed in each of the slots for engagement with the depressions of the block so that the base can be retained in place.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
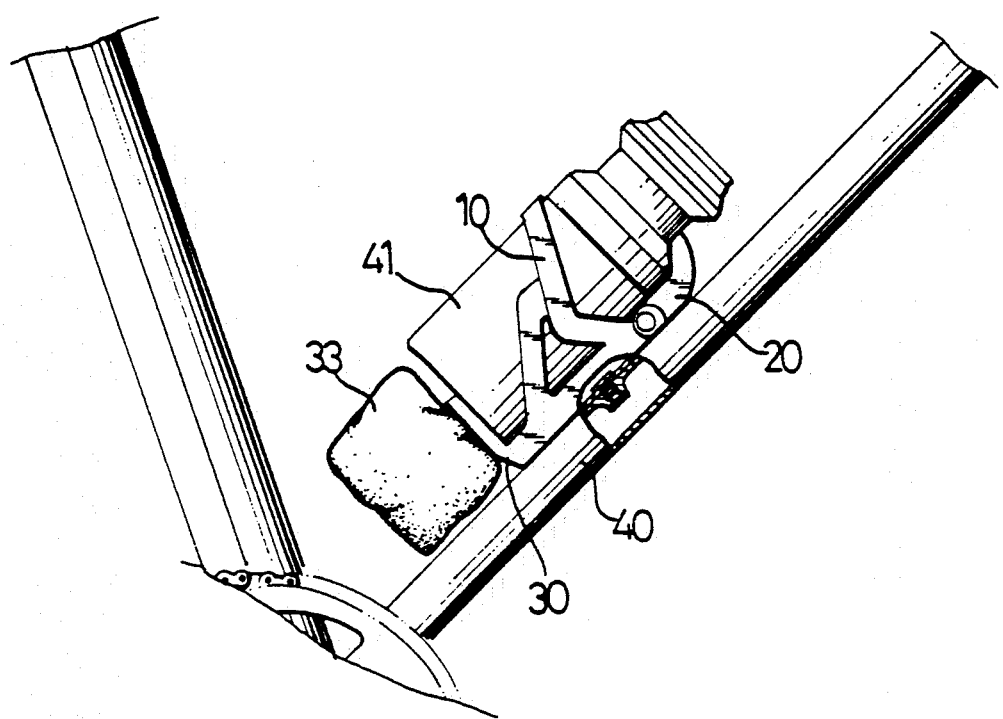
FIG. 1 is a plane view of a bottle holder in accordance with the present invention which is fixed to the downtube of a bicycle.
Figure 2:
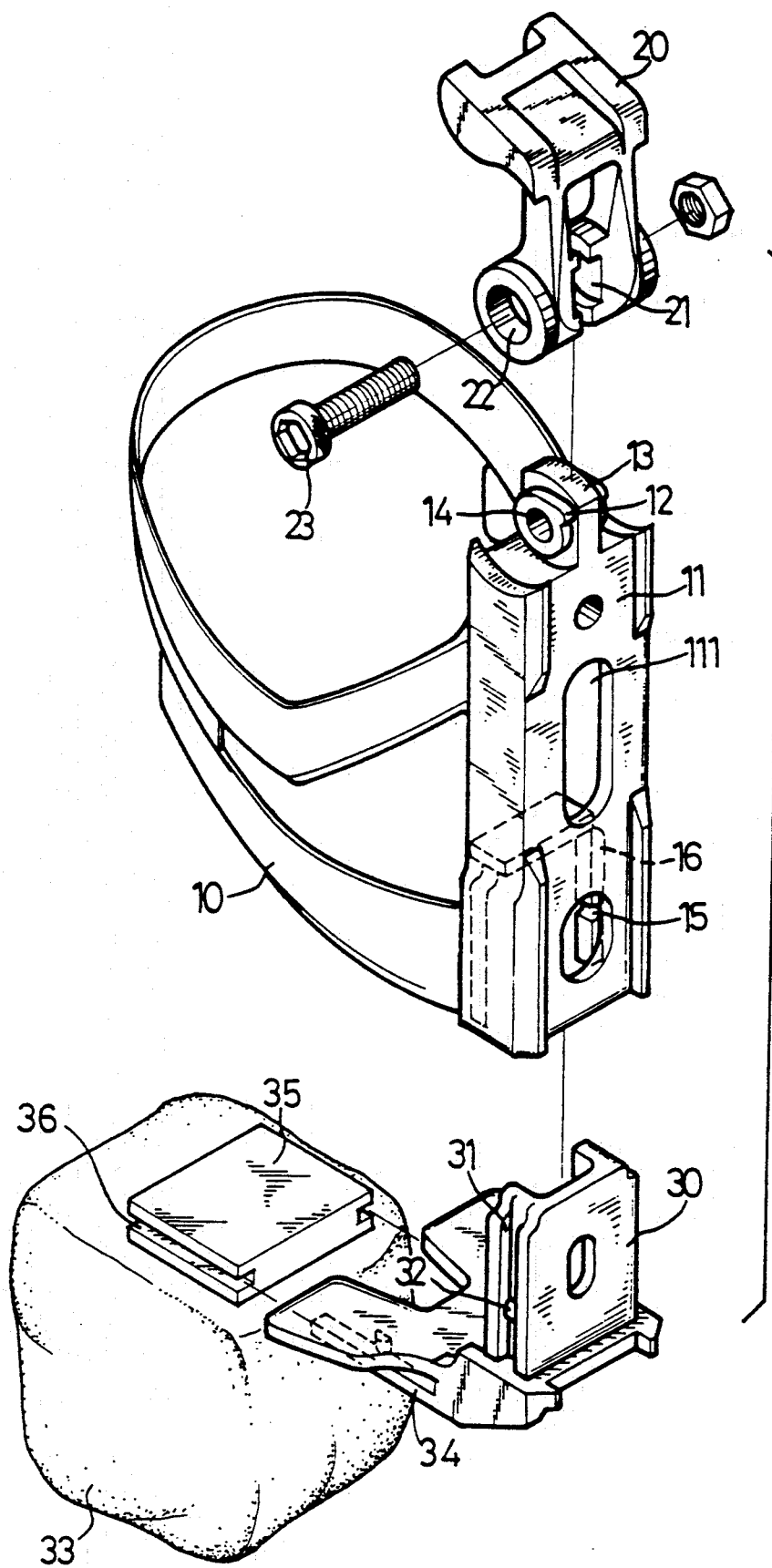
FIG. 2 is an exploded view of the bottle holder.
Figure 3:
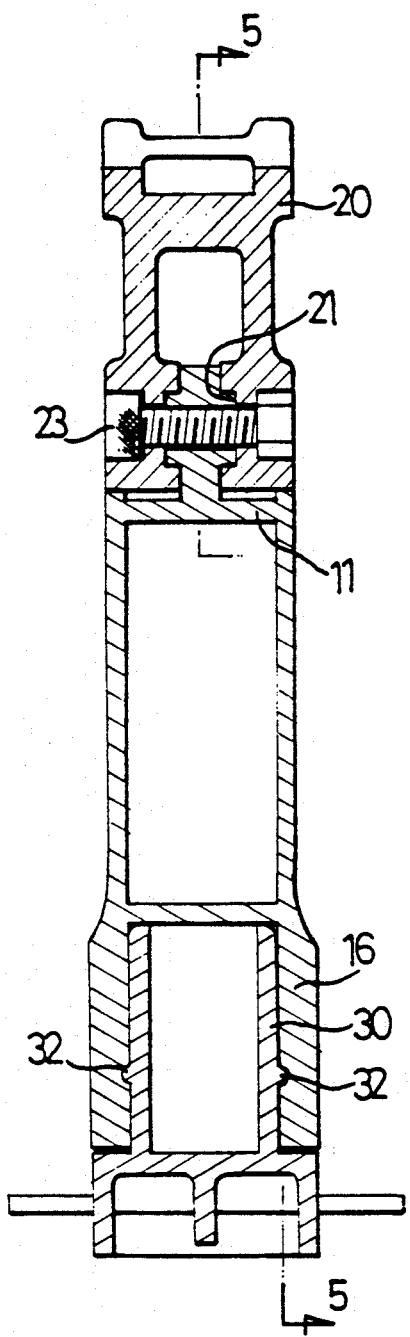
FIG. 3 is a cross sectional view of the bottle holder taken along lines 3—3 of FIG. 5.
Figure 4:
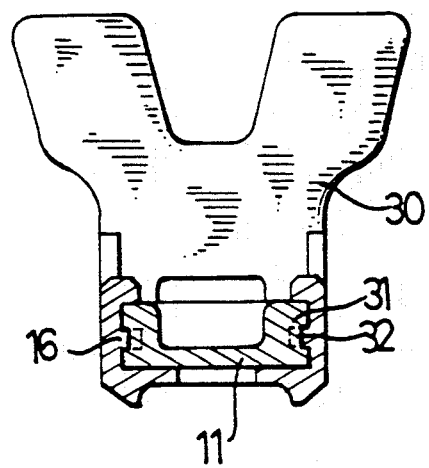
FIG. 4 is a partial cross sectional view of a base.

Referring to the drawings, and initially to FIG. 1, a bottle holder in accordance with the present invention comprises generally a frame 10 fixed to the downtube 40 of a bicycle for holding a bottle 41, a retainer 20 pivotally coupled to the upper portion thereof, and a base 30 coupled to the bottom portion thereof for supporting the bottle 41. A bag 33 and the like can further be coupled to the base 30 for carrying other small objects, such as coins, etc.

Referring next to FIGS. 2 to 5, the frame 10 includes a block 11 having an oblong hole 111 formed therein, through which bolts can pass and can engage to the downtube 40 of the bicycle. An extension 13 is formed integral on the top portion of the block 11 and has a cam portion 12 formed integral on each side thereof, and includes an aperture 14 laterally formed therein. A pair of ribs 16 are formed in parallel in the bottom portion of the block 11 and each has a depression 15 formed therein.

Figure 5:
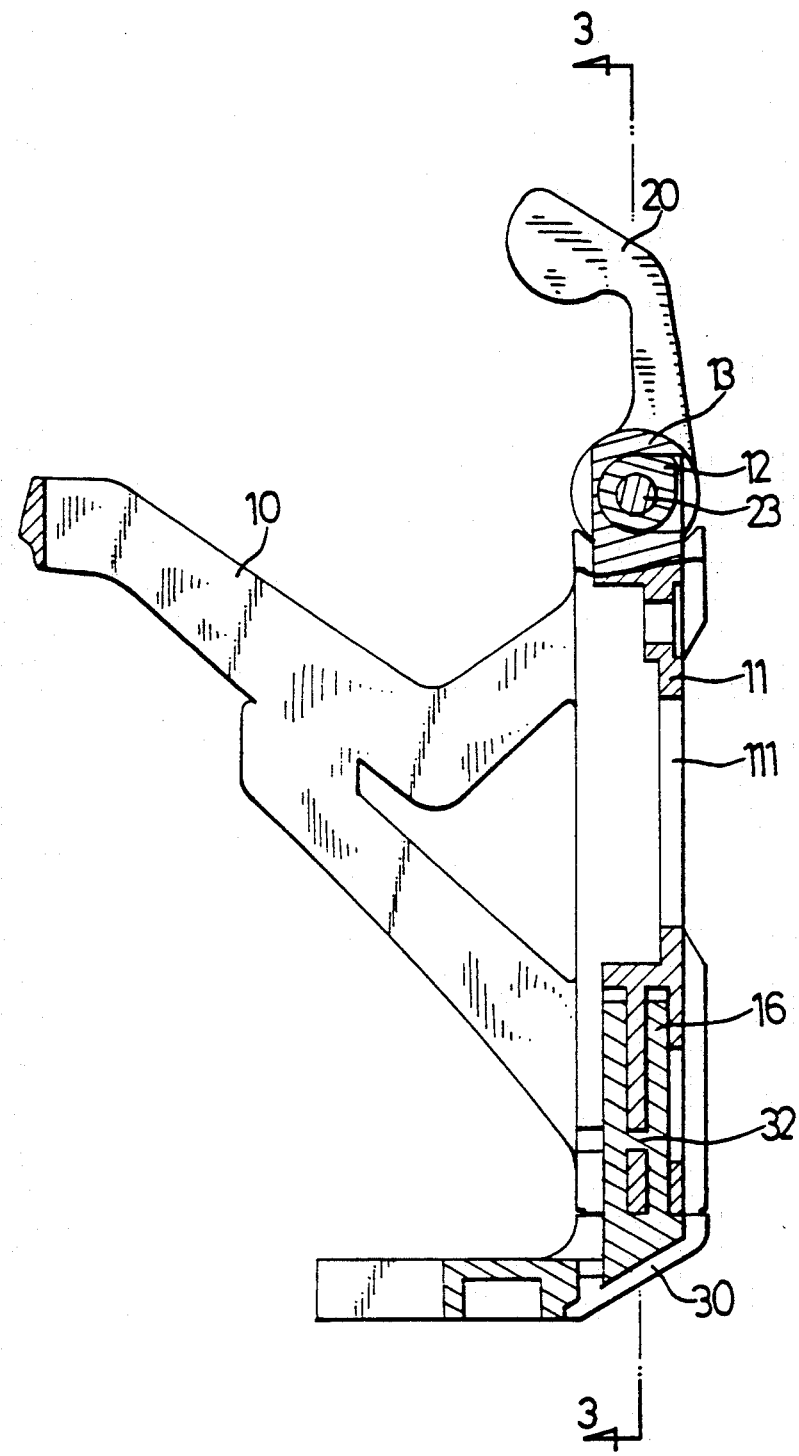
FIG. 5 is a cross sectional view taken along lines 5—5 of FIG. 3.

The retainer 20 includes an opening 21 formed in the lower portion and an orifice 22 laterally formed therein. A bolt 23 passes through the orifice 22 of the retainer 20 and the aperture 14 of the extension 13 so that the retainer 20 can be pivotally coupled to the block 11. As best shown in FIG. 5, the cam portions 12 are engaged in the opening 21 of the retainer 20 and arranged such that the retainer 20 can easily rotate counterclockwise about the bolt 23 (rotation of the retainer toward the bottle 41), and the clockwise rotation of the retainer 20 (rotation of the retainer 20 away from the bottle 41) is limited so that the bottle 41 can be retained in place by the retainer 20, best shown in FIG. 1.

The base 30 includes two slots 31 formed in each side thereof for engagement with the ribs 16 of the block 11 so that the base 30 can be coupled to the block 11, a protrusion 32 is formed in each of the slots 31 for engagement with the depressions 15 so that the base 30 can be retained in place. The base 30 includes a pair of beams 34 formed integral on the bottom portion thereof. The bag 33 has a member 35 fixed on the top portion thereof. The member 35 includes a channel 36 formed in each side thereof for engagement with the beams 34 so that the bag 33 can be coupled to the base 30.

Accordingly, the bottle holder in accordance with the present invention includes three different parts which can be easily manufactured separately and can be easily assembled so that the manufacturing thereof is easier.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A holder for a bicycle, said holder comprising a frame to be used with holding a bottle, a block formed integral on said frame and fixed to said bicycle, an extension formed integral on top of said block, a cam portion formed integral on each side of said extension, a retainer which is provided for retaining said bottle including a lower portion pivotally coupled to said extension and having an opening formed in said lower portion for engagement with said cam portions of said block to limit rotation of said retainer relative to said block, a pair of ribs formed in parallel in a lower portion of said block and each having a depression formed therein, a base supporting a lower portion of said bottle having a slot formed in each side thereof engaging said ribs of said block so that said base is coupled to said block, and a protrusion formed in each of said slots engaging said depressions of said block to retain said base in place.

2. A holder according to claim 1, wherein said base having a pair of beams formed integral on a bottom portion thereof, a bag includes a member formed integral on top thereof, said member having a channel formed in each side thereof for engaging with said beams of said base for attaching said bag to said base.

* * * * *